March 10, 1925.
1,528,937
F. L. MAIN
VEHICLE WHEEL
Filed Aug. 1, 1923
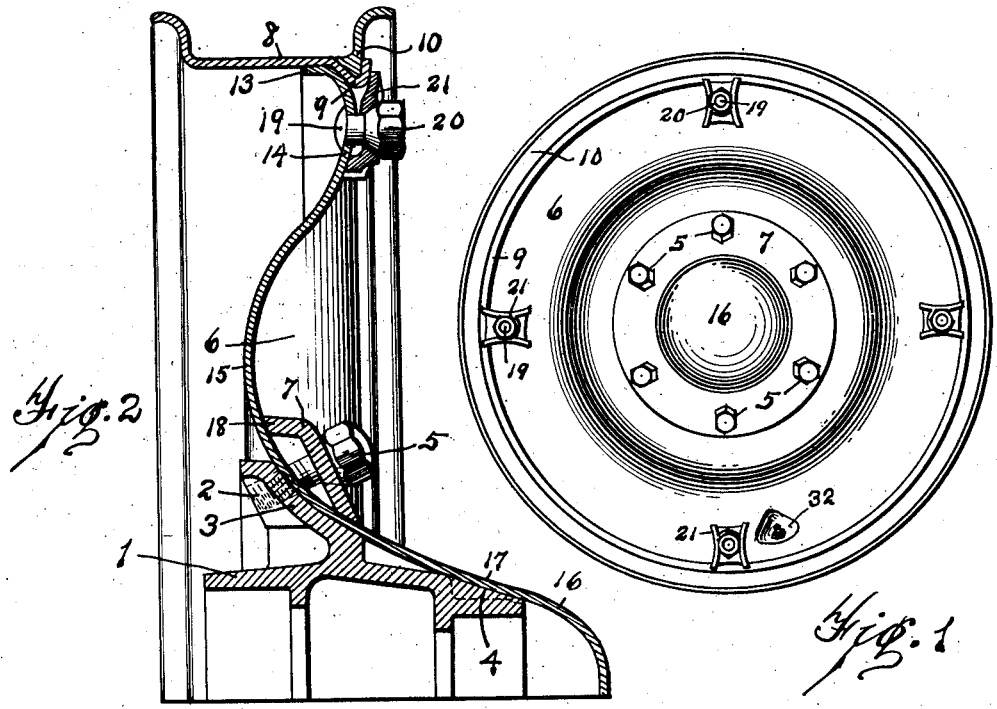
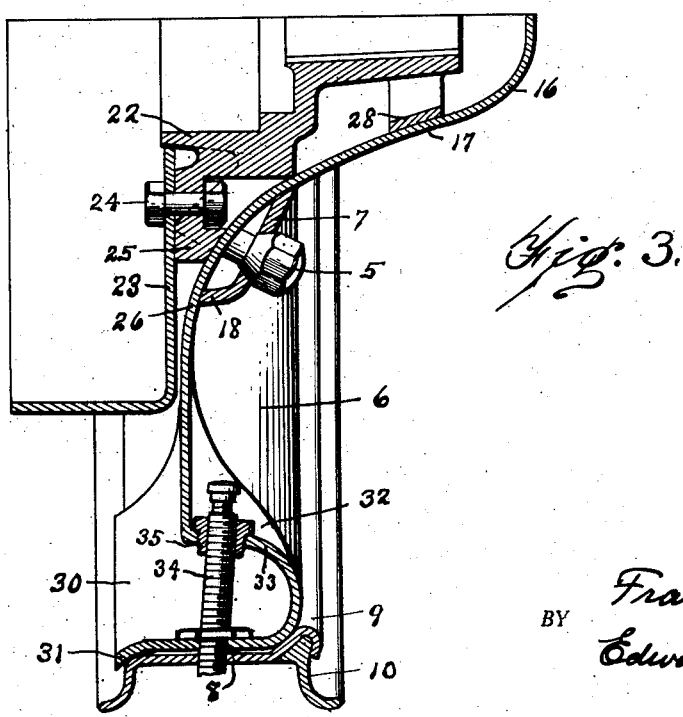
INVENTOR.
Frank L. Main
BY Edward N. Pagelsen
ATTORNEY.

Patented Mar. 10, 1925.

1,528,937

UNITED STATES PATENT OFFICE.

FRANK L. MAIN, OF BIRMINGHAM, MICHIGAN, ASSIGNOR TO HAYES WHEEL COMPANY, OF JACKSON, MICHIGAN, A CORPORATION OF MICHIGAN.

VEHICLE WHEEL.

Application filed August 1, 1923. Serial No. 655,021.

*To all whom it may concern:*

Be it known that I, FRANK L. MAIN, a citizen of the United States, and residing at Birmingham, in the county of Oakland and State of Michigan, have invented a new and Improved Vehicle Wheel, of which the following is a specification.

This invention relates to the construction of vehicle wheels wherein the stresses are transmitted between the rim and the hub by means of a disc of sheet metal of practically uniform thickness, and the object of this invention is to provide a wheel of this character in which the disc also embodies a hub cap, in which the disc shall fit the hub along two spaced circumferential surfaces, and which shall have maximum carrying capacity with maximum flexibility.

In the accompanying drawing, Fig. 1 is a side elevation of a wheel embodying the present invention. Figs. 2 and 3 are radial sections in planes passing through the axes of two embodiments of the present invention.

Similar reference characters refer to like parts throughout the several views.

In Fig. 2, the hub 1 is provided with a flange 3 and with a substantially conical bearing surface 4 spaced from the flange 3. The flange 3 may be formed with lugs 2 at intervals to furnish sufficient metal to be drilled and tapped to receive the screws 5 which pass through holes in the disc 6 and in the clamping ring 7. I prefer to make conical the holes in the clamping ring in which the inner portion of the heads of the screws are received so that the ring 7 will be properly positioned. I also prefer the screws 5 to extend at an angle to the axis of the wheel so that they may be more accessible.

The demountable rim 8 is of the well known QD type and has an inwardly extending circumferential rib 9 formed by rolling in the groove which receives the split ring 10.

Between the rim 8 and the hub 1 is the disc 6 which is pressed from a flat sheet so as to comprise a practically cylindrical outer edge 13, an outwardly convex portion 14 adjacent thereto which merges into the outwardly concave middle portion 15 of the disc whose inner edge fits the curved face of the flange 3 on the hub and is pressed against this flange by means of the clamping ring 7.

The central portion 16 of the disc constitutes a hub cap and merges into the outwardly concave middle portion 15. The disc may be so formed that this hub cap portion connects to the main middle portion of the disc by a conical portion 17 which fits the conical bearing surface 4 of the hub. This conical surface and the face of the flange 3 are preferably accurately machined.

The deepest portion of the outwardly concave portion of the disc is preferably one-half the distance from the axis of the wheel to the demountable rim. Forming the disc proper integral with the hub cap eliminates the unsupported inner edge of the disc which was usually a source of weakness for the disc. The outer flange 18 of the ring 7 contacts with the disc beyond the outer edge of the flange 3 and thereby stresses the disc to such an extent that vibration thereof within the line of this flange 18 is practically eliminated. The disc yields between the flange 18 and the line of contact with the rib 9 on the rim.

Any desired number of bolts 19 are mounted in the outwardly convex portion 14 of the disc and the nuts 20 thereon secure the rim clamps 21 in position. These clamps press against the rib 9 on the rim 8 and tend to force this rib up onto the adjacent inclined portion of the disc, thus securing perfect centering of the rim on the disc.

The structure shown in Fig. 3 is a rear or driving wheel while that shown in Fig. 2 is a steering wheel. The hub 22 has a brake drum 23 attached to it by means of bolts 24. The flange 25 is again formed with a curved surface to fit the inner part of the outwardly concave portion 26 of the disc 6, and the outer flange 18 of the clamping ring 7 again tends to stress the disc 6 at the outer edge of the flange 25 by means of the screws 5 which again extend at an angle to the axis of the wheel. The central portion of the disc again constitutes a hub cap 16 and the disc has a conical portion 17 to fit the conical portion 28 of the hub.

This disc may be sheared from a rectangular sheet, but instead of retaining no more than the largest circular portion, I prefer to form the blank with four circular segments which constitute flanges 30 when the blank is pressed to constitute a disc. The outer edges 31 of these segments are preferably bent outward to contact with the rim 8 along a line opposite to the rib 9 thereon and thus assists in properly supporting the rim on the disc. The outer portion of the disc may also be formed with a recess 32 whose wall 33 is perforated to permit the passage of the tire-valve stem 34 which may be held from rattling by means of a bushing 35.

The details of construction and proportions of the parts may all be changed by those skilled in the art without departing from the spirit of my invention as set forth in the following claims.

I claim:—

1. In a wheel, the combination of a rim, a hub having a flange, a sheet steel disc of substantially uniform thickness bearing on the hub flange and on the hub outside of the flange, the central portion of the disc constituting a hub cap, said disc being concave outward from said hub cap to an outwardly convex portion adjacent the rim.

2. In a wheel, the combination of a rim having an interior circumferential rib, a hub having a flange provided with a concave surface, a sheet steel disc of substantially uniform thickness bearing on the hub flange and having its central portion constituting a hub cap, said disc being concave outwardly from the inner edge of the hub cap to an outwardly convex portion which has a line engagement with the rib on the rim, and means to secure the disc to the hub flange.

3. In a wheel, the combination of a rim having an interior circumferential rib, a hub having a flange provided with a concave surface, a sheet steel disc of substantially uniform thickness bearing on the hub flange and having its central portion constituting a hub cap, said disc being concave outwardly from the inner edge of the hub cap to an outwardly convex portion which has a line engagement with the rib on the rim, and means to secure the disc to the hub flange comprising a clamping ring having a circumferential flange engaging the disc outside the flange on the hub to tension the disc, and bolts to secure the clamping ring and disc to the flange.

4. In a wheel, the combination of a rim, a hub having a flange, and a disc secured to the flange on the hub and having its medial portion outwardly concave and its outer portion reversely bent to form a felly to receive said rim, the central portion of the disc being domed to constitute a hub cap.

5. In a wheel, the combination of a hub, a disc attached thereto and having its edge formed to receive a rim and its central portion domed to constitute a hub cap, said hub being formed with a bearing surface to fit the disc, a clamping ring to secure the disc to the hub, and screws extending through the clamping ring and disc into the hub.

6. In a wheel, the combination of a rim, a hub, a disc supporting the rim and having its medial portion outwardly concave and its central portion domed to constitute a hub cap, said hub being formed with a bearing surface to fit said concave medial portion of the disc, and a clamping ring to secure the disc to the hub and having a circumferential flange engaging the disc outside the bearing surface on the hub to tension the disc.

7. In a wheel, the combination of a rim, a hub, a disc supporting the rim and having its medial portion outwardly concave and its central portion domed to constitute a hub cap, said hub being formed with a bearing surface to fit said concave medial portion of the disc, a clamping ring to secure the disc to the hub and having a circumferential flange engaging the disc outside the bearing surface on the hub to tension the disc, and bolts to secure the clamping ring and disc to the hub and extending substantially normal to the bearing surface of the hub.

FRANK L. MAIN.